Patented Oct. 19, 1926.

1,603,783

UNITED STATES PATENT OFFICE.

CHAUNCEY C. LOOMIS AND ARTHUR L. KENNEDY, OF NEW YORK, N. Y., ASSIGNORS TO KELP PRODUCTS CO., INC., A CORPORATION OF NEW YORK.

METHOD OF MOLDING AND HARDENING ALGIN-CONTAINING MATERIAL AND PRODUCT THEREOF.

No Drawing. Application filed August 17, 1921. Serial No. 493,119.

In our co-pending application, Serial No. 467,312, filed May 6, 1921, we disclosed methods of molding and setting or hardening shapes from algin or alginate or from the intimate mixture of algin or alginate with the algulose and other organic constituents of the whole kelp leaf. In most of these methods it is necessary to remove a considerable amount of water from the molded article, in order to set or harden the same. This removal of water results in a large shrinkage, accompanied by a tendency of the molded article to warp and crack. This has been a great difficulty in the practical application of these materials to the plastic fields. Furthermore the incorporation or mere presence of this relatively large percentage of moisture in the plastic material tends to deterioration of the final molded product and to render it less suitable for making useful articles or products which must possess a certain amount of strength depending upon the uses to which they are to be put. This deteriorating effect of moisture is probably due to its hydrolytic action upon the various organic constituents of the sea-weed which action appears to be increased or catalyzed by the alkali or other hydrolytic agents present in the mass; by heating; by long continued action and similar factors known to influence hydrolysis of organic compounds in general. Also the repeated incorporation of water into the mass and its repeated expulsion appears to have a similar effect and we, therefore, usually avoid repeated moistening and drying of the organic sea-weed material where this is feasible.

We have now discovered that if these algin containing materials are dried and pulverized to a fine powder, and then moistened with a minimum amount of water or aqueous solution of ammonia, or alkali hydroxide or carbonate, and then subjected to pressure in a mold, a hard homogeneous mass is obtained which contains so little water that there is only a slight shrinkage in bringing it to complete dryness, and warping is almost wholly obviated. At the same time any suitable filler can be incorporated by thoroughly mixing with the dried powder before moistening and molding under pressure.

*Example 1.*

Fifteen parts of kelp leaf are dried and ground till they will pass through a 100 mesh screen. The resulting powder is then moistened with 5 parts of 28% ammonia solution and thoroughly mixed so that the moisture is evenly distributed. Powder still appears quite dry and does not agglomerate except under pressure. It is now transferred to a mold, and a pressure of several tons applied to it, for a few minutes. On removal from the mold, the mass is quite hard and homogeneous. It should be allowed to cure for several days, however, to develop much strength. In this curing the moisture slowly evaporates and there is a slight shrinkage, but this is negligible as compared with the old methods. In place of ammonia, solutions of other alkali hydroxides or carbonates can be used.

*Example 2.*

Fifteen parts of the dried copper compound of the entire kelp leaf, made either by direct treatment of the leaf with a solution of a soluble copper salt, or by double decomposition of a mixture of kelp leaf and an alkali hydroxide or carbonate solution with a soluble copper salt, is ground to 100 mesh and moistened with 5 parts of 28% ammonia. It is then thoroughly mixed and molded under pressure.

Similarly other salts of the kelp can be dried, ground and then moistened with a minimum amount of either water or a water solution of an alkali hydroxide or carbonate and then molded under pressure.

Also the so-called alginic acid or alginates made by extracting kelp leaves with alkali and filtering from algulose and other organic constituents, can be dried, ground, moistened, and then molded under pressure in a similar manner.

It is also possible to take the precipitated salts, squeeze as much water as possible out of them, break up the cake, dry further in a humid atmosphere to prevent crustings till the moisture content has been lowered to about 25%, disintegrate, and then mold under pressure.

We claim:

1. The method of molding algin-containing material into any desired shape and hardening the same which comprises converting the algin in the material into an insoluble alginate, adding a relatively small amount of a softening agent to the dried algin-containing material but insufficient to bring the total moisture content above about 25%, and then subjecting the softened material to pressure in a mold, whereby the material is caused to assume a desired shape, and then removing sufficient water to harden the molded product.

2. The method of molding algin-containing material into any desired shape and hardening the same which comprises converting the algin in the material into an insoluble alginate, adding a relatively small amount of an aqueous softening agent to the dried algin-containing material but insufficient to bring the total moisture content above about 25%, and then subjecting the softened material to pressure in a mold, whereby the material is caused to assume a desired shape, and then removing sufficient water to harden the molded product.

3. The method of molding algin-containing material into any desired shape and hardening the same which comprises converting the algin in the material into an insoluble alginate, adding a relatively small amount of basic aqueous softening agent to the dried algin-containing material but insufficient to bring the total moisture content above about 25%, and then subjecting the softened material to pressure in a mold, whereby the material is caused to assume a desired shape, and then removing sufficient water to harden the molded product.

4. The method of molding algin-containing material into any desired shape and hardening the same which comprises converting the algin in the material into an insoluble alginate, adding a relatively small amount of water to the dried algin-containing material but insufficient to bring the total moisture content above about 25%, and then subjecting the softened material to pressure in a mold, whereby the material is caused to assume a desired shape, and then removing sufficient water to harden the molded product.

5. The method of molding and hardening algin-containing material, which comprises converting the algin in the material into an insoluble alginate, grinding the material, adding an aqueous softening agent in quantity insufficient to cause agglomeration of the particles, and shaping the material by pressure in a mold and then removing sufficient water to harden the molded product.

6. The method of molding and hardening algin-containing material which comprises converting the algin in the material into an insoluble alginate, adding a softening agent short of the amount which will cause agglomeration of the particles and shaping by pressure in a suitable mold and then removing sufficient water to harden the molded product.

7. The method of molding and hardening algin-containing material, which comprises converting the algin in the material into an insoluble alginate, adding an aqueous softening agent short of saturation of the particles, and shaping by pressure in a suitable mold and then removing sufficient water to harden the molded product.

8. As a new product of manufacture, a solid comprising an alginate and less than about 25 per cent by weight of water homogeneously combined therewith and capable of being molded in the cold under pressure and capable also of becoming hard after molding, substantially as described.

9. As a new product of manufacture, a solid comprising algulose and an alginate and characterized by possessing the hardness of ordinary hard wood and capable of being sawed, turned and otherwise machined with the tools commonly employed in wood-working, substantially as described.

In testimony whereof I affix my signature.

CHAUNCEY C. LOOMIS.

In testimony whereof I affix my signature.

ARTHUR L. KENNEDY.